Oct. 5, 1943.    J. E. MULLEN    2,330,837
METHOD OF MAKING CONTACT LENS
Original Filed Dec. 30, 1939    2 Sheets-Sheet 1
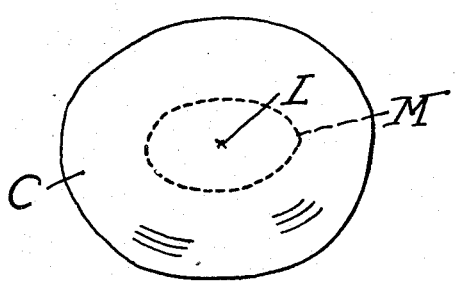
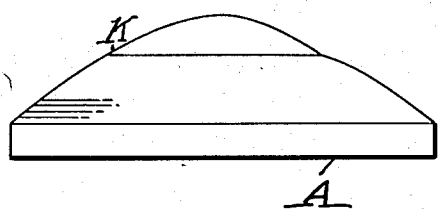
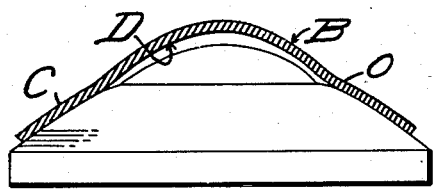
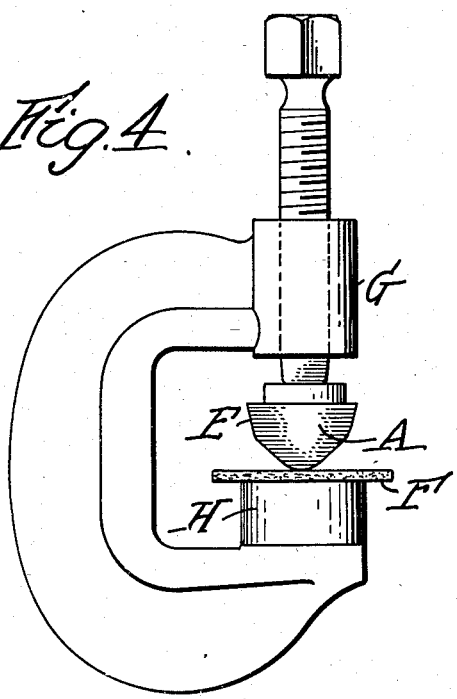
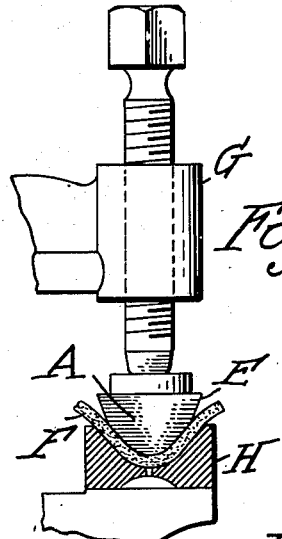

Oct. 5, 1943.  J. E. MULLEN  2,330,837
METHOD OF MAKING CONTACT LENS
Original Filed Dec. 30, 1939  2 Sheets-Sheet 2
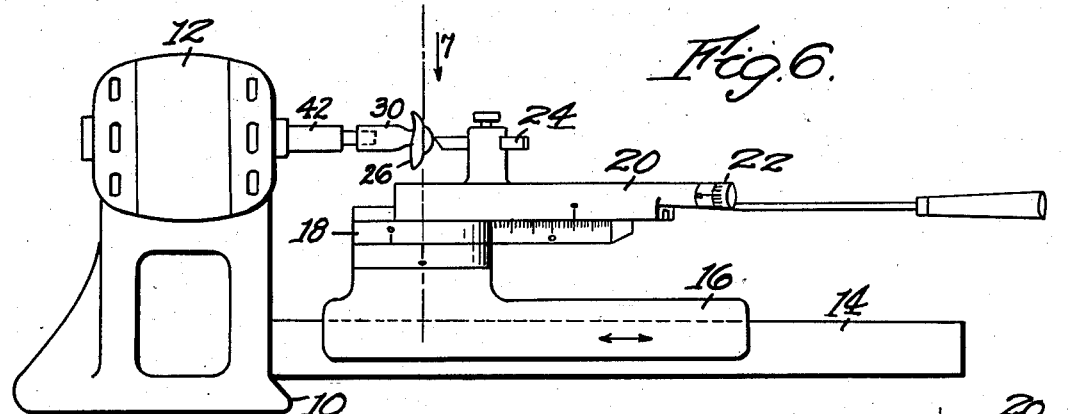
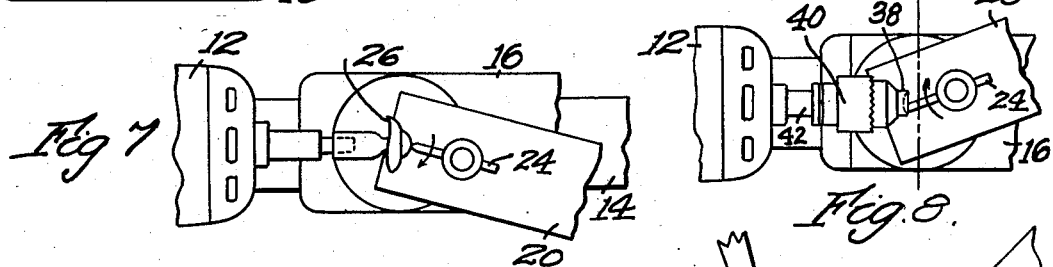
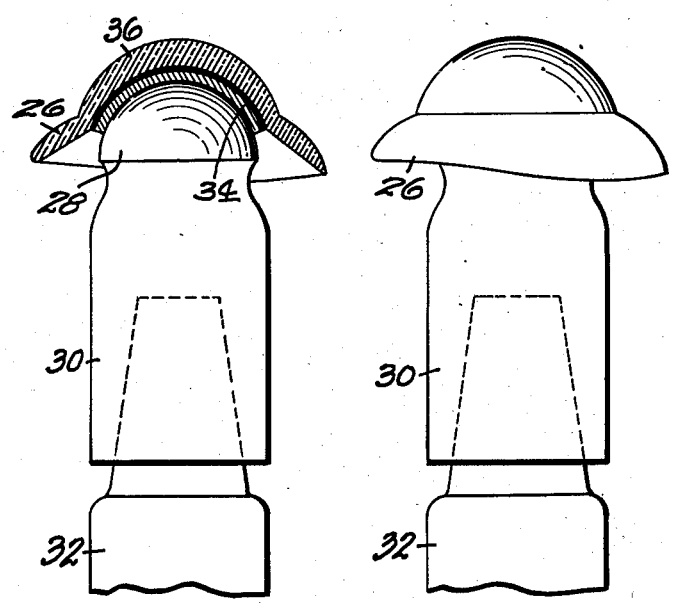
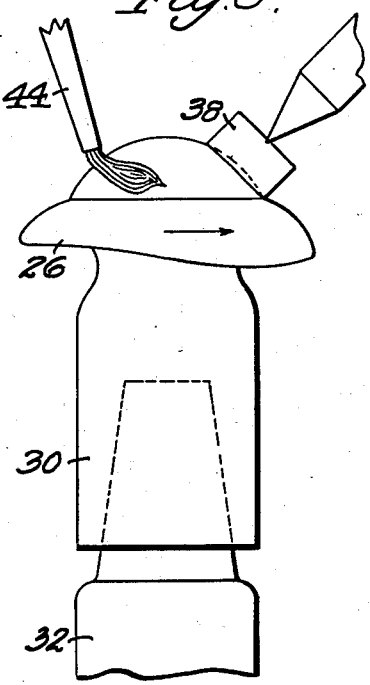

Patented Oct. 5, 1943

2,330,837

UNITED STATES PATENT OFFICE 2,330,837

METHOD OF MAKING CONTACT LENSES

John E. Mullen, Boston, Mass.

Original application December 30, 1939, Serial No. 311,951. Divided and this application December 16, 1940, Serial No. 370,381

7 Claims. (Cl. 18—56)

In the art of making a contact lens, it has been the practice to use only one material successfully, namely, glass. But it is considered in the art that there exists the possibility of another material, giving rise to what is referred to as the "plastic" contact lens, and this is the subject matter to which the present invention is directed.

A contact lens, being worn directly on the human eyeball, presents certain objections when made of glass. A plastic contact lens obviates these objections. The best description of the word "plastic," a noun, as it is used in the sense meant in this invention and in the art of contact lenses, is the one given it by the plastics industry itself. The plastics industry considers a plastic to be any of numerous materials which lend themselves to certain types of fabrication procedure. The methods of fabricating a plastic into articles of merchandise for sale either as finished products or for use in finished products, such as ash trays, combs, parts for automotive equipment, electrical equipment, etc., largely determine what the plastics industry would classify as a plastic. In this invention, the word "plastic" is used in the sense in which it is used by the plastics industry and by the various house organs and periodicals of the plastics industry. A plastic is a material which lends itself usually to certain types of injection or pressure molding at certain temperatures, or which lends itself to machining operations. These definitions are far from adequate, as would also be any attempt to define plastics by any chemical analogy. While chemistry has been responsible largely for the development of most plastics, they are not all taken care of by any one chemical definition. The best definition that can be given is that which can be supplied by the trade or the plastics industry. To the plastics industry there exists a vast difference between "glass" and "plastic." The same difference exists in the minds of those in the art of contact lenses who refer to "glass contact lenses," and "plastic contact lenses."

For our purposes it is necessary in a contact lens to have a material which is described by its adaptability to our particular use. The material must have good optical properties, be workable by some process of fabrication, and be chemically harmless to the eye. Above all, the material must be resistant to breakage and shattering while being worn in the eye.

A material which has the latter property must be something other than glass, because the so-called unbreakable types of glass either do not lend themselves to the type of fabrication required in forming a contact lens, or in fact, whether they are called unbreakable or not, they of course do break and are only called unbreakable because of the way they break, which is harmless to nearly everything except the eye. While the average plastic material, suitable for our purposes in a contact lens, will break, it will only split, giving vastly less danger of damage to the eye before the one or two pieces which are left can be removed. In fact, a broken plastic contact lens, if indeed a plastic contact lens could be broken at all in the eye, could not by any conceivable stretch of the imagination be broken into more than one piece with one or two cracks in it.

There is a definite quality about the plastic which gives it this resistance to fracture or to shattering; this quality is its low hardness. This feature is the whole secret of early objections to the use of plastics for contact lenses. It was feared that even if a plastic contact lens could be made by molding operations entirely, even getting a clear and perfect lens portion, the latter would become scratched because of its softness in ordinary use, from being carried about. Furthermore, it was believed possible to make a lens good enough for clear vision only by molding processes. It is known in the art to be impossible to make a plastic lens of any sort, optically perfect, by grinding methods. The only way to make an optically perfect plastic lens is to mold it between optically perfect dies.

Now, with any material, fracture resistance, which is rather proportionate to resiliency, is proportionate and increases with a falling off in hardness. As hardness becomes lower, resistance to shattering or breaking which might form particles capable of hurting the eye increases. Conversely, to increase the resistance to fracture the hardness must be lower in the material selected. Naturally it is desirable to select the material with the greatest resistance to fracture. To do this a material must be selected which is as low in hardness as can be reasonably worked by reliable fabrication methods.

In considering the possibilities of making a satisfactory plastic lens, several objections are encountered. First, die methods are practical only in production methods, but contact lenses to be successful must be made for the individual by the utmost personal and specialized attention to each patient. Second, each lens must be of different power according to the refraction needs for vision of the individual eye. Even after a lens is made, it usually must undergo a power change. Die methods do not admit of using precalculated powers nor of changing the power once it has been made. The thickness of a lens is one of the factors in determining its power, and die methods make thickness determination in custom-made contact lenses a very awkward procedure, entirely beyond the realm of reasonable manufacture. There are other objections to the die method for making contact lens corneal portions.

Eliminating the die method except as to preliminary blanking, the present inventor found that some method designed to the particular need of the particular lens must be tried. It was discovered that ordinary lens-making procedure as used in making glass lenses was also out of the question. In the form-grinding and lapping operations known in the industry, the forming-laps or shaping-laps are softer than the surface being ground. The softer lap retains the abrasive grain and causes it to work on the harder surface of the lens being ground. Hence in grinding glass lenses, soft cast-iron laps are used, the soft surface of the iron becoming charged with the abrasive which travels with the lap and cuts the glass against which it moves and cuts. It was a problem to find a lap softer than plastic; Celluloid, Bakelite, or the like, would be so soft that it would not retain its shape for many moments of grinding. However, most plastics lend themselves to machine-turning operations, such as on the lathe, and other machine-shop turning and cutting procedures. The present inventor discovered that these procedures can be used to bring the lens portion of a contact lens roughly to shape at a required thickness and proper curve. Even then, the polishing operation still presented the difficulty just stated, and this objection also has now been overcome by this invention.

One of the major problems with the plastic was that of how to make the scleral band of the contact lens conform to the contour of the white of the eye. In order to give a contact lens support on the eye, the sclera, or "white," of the eye is made to support the lens. For numerous reasons, it is considered best to make this supporting band of the lens fit the living contour of the actual eye by making a model of the eye, from an impression for instance, and making the supporting band from this model. Many problems are met with in this matter of making the lens so it will have identical contour with the eyeball. Prior methods give too little accuracy and the lenses do not fit closely enough to guarantee their staying in one position on the globe, to prevent their becoming dislocated or to prevent the admission of bubbles beneath them while wearing. No two eyes have the same contour or curvature of globe. The only way to guarantee a fit is to have an accurate model of the eye and from it to make an accurately-fitting scleral band, true as far as possible to the eye's own curvature, contour, and individual irregularity. But even given an accurate model, earlier technicians have found it difficult to duplicate that model's contours as exactly as is to be desired in the finished contact lens itself.

Objects of the present invention include the provision of a contact lens and method of making it in which a plastic material forms the entire lens without the use of glass; the provision of an entirely custom made individual lens and method in which the inside of the lens conforms to and fits the eye as required with regard to shape, contour, and necessary clearance of the cornea for each particular patient; the provision of a plastic lens having a good curve, especially with regard to the uniformity of pressure over the supporting scleral or white-of-the-eye area, and method of making such a lens; and the provision of a plastic lens portion and method overcoming the above mentioned difficulties encountered in the prior art.

Other objects and advantages of the invention will appear hereinafter.

Reference is to be had to the accompanying drawings, in which

Fig. 1 is a plan view of a model of the front of the eye;

Fig. 2 is a side elevation of Fig. 1;

Fig. 3 is a view in elevation of the model showing the contact lens in position as on an eyeball, the lens being in section;

Fig. 4 is a view in elevation of the die pressing apparatus;

Fig. 5 is a view similar to Fig. 4, but having parts broken away and showing the plastic in its blanked form;

Fig. 6 is a view in elevation of apparatus for cutting the lens;

Fig. 7 is a partial plan view of Fig. 6;

Fig. 8 is a partial plan view of the apparatus shown in Fig. 6, but used to cut a grinding lap;

Fig. 9 is an elevation of the lens holder, showing the rough blanked lens in section; and Fig. 10 and Fig. 11 are views similar to Fig. 9 but showing the lens as cut-finished and in the process of grinding.

Any lens or lens systems can have but two focus points, according to the principle of conjugate foci. In the system of the eye one of these points is located at the point of fixation, the object at which the eye is looking; the other point of focus is at the retina where the rays of light from the object come together again to form the image. The point of fixation and the point of focus on the retina of the image are the only two foci that can exist simultaneously in the eye system. Furthermore, the eye cannot fix upon a point nearer than, normally, a few inches from the cornea of the eye. The present inventor discovered, that with the two foci established at points other than at the cornea or front of the eye, any object at the cornea, such as a speck on the cornea, or an imperfection on the lens portion of a contact lens, would not be visible to the subject. Unless it were large enough to reduce the admission of light noticeably, no confusion would be noticed. The eye cannot fix upon a blemish or imperfection or foreign body located on the cornea or on a contact lens being worn over the cornea.

The present inventor discovered the application of the above principle to the use of a plastic contact lens which, instead of requiring greater optical finish than a spetcacle lens, which is worn at a point removed further from the eye and nearer the point of fixation, required less finish for vision therethrough. The present inventor discovered that a badly scratched contact lens, even heavily abraded and pitted, may give perfect vision in every respect, as to clarity, visual acuity, etc., and that as long as the general curvature of the lens curve is true, no distortion or confusion whatever results to vision.

Besides the principles of conjugate foci, there is another factor in the contact lens which contributes to good vision; this is the fact that a capillary film of water over the front of the contact lens while being worn provides at all times the clarity and finish necessary to clarity of vision.

These considerations, i. e., the conjugate foci principle and the capillary film features have proved the feasibility of the plastic contact lens. Although it seemed unlikely that any rational method of making a contact corneal lens free from scratches could ever be devised, the present inventor has devised the following methods for making a corneal lens which has as few scratches and blemishes as possible, discovering that such a lens was serviceable under substantially all conditions and that its qualities, as a plastic, offered additional advantages to those offered by the contact lens which used glass.

To initiate the procedure of supplying a patient with contact lenses, the dispenser supplies the lens-maker with a model of the front of the eye, made in plaster-of-Paris or dental stone (modeling stone) or any other positive modeling material. This model shows the cornea of the eye and an area of the sclerotic to considerable extent beneath the eyelids. The present inventor, wishing to preserve the original model of the eye, makes a duplicate of the original by pressing it into some child's modeling clay or artist's modeling clay, using some suitable separator such as talcum powder or water; this results in a negative of the eye, into which negative plaster-of-Paris or dental stone is poured. When the latter has set, a duplicate positive A of the eye has been obtained, as shown in Fig. 2.

In fitting the contact lens B, it is generally the practice to use the sclerotic area C of the contact lens for support upon the eyeball and to clear out the corneal area D by grinding or cutting so as to raise the inner corneal portion of the lens clears of the cornea. But the scleral band of the lens must be fitted so that it will conform to the contour of the model of the eye of each individual patient and hence to the scleral area of the eye itself. To do this, it is necessary to have a die over whose surface the inside of the contact lens may be formed. The making of a metal die is expensive, but the inventor discovered that the stone die A itself would stand the pressure necessary for molding if its surface were coated with graphite E, a little oil or other vehicle being perhaps used with the graphite to drive it well into the surface of the stone. The graphite renders the surface of the stone smooth and slippery, with the appearance of metal, and acts as a separator to keep the plastic lens blank F from adhering to the stone and tearing away the stone or breaking the whole model down under pressure.

After the model has been treated with graphite, a blank piece of plastic F is placed between a blanking die H and the surface of the model A, the blanking die being of a form designed to press the lens stock and its scleral band fairly uniformly over the surface of the stone model. This assembly is then inserted between the jaws of a small C clamp G, as illustrated in Fig. 4 of the drawings. The clamp and its contents are then heated in an oven or in a heating bath until the softening point of the plastic blank has been reached, making it possible to screw up the clamp and press the dies together. The clamp and its contents are then allowed to cool as slowly as possible to avoid the presence of stresses within the formed lens blank. When it is thoroughly cooled, the clamp is loosened and the blank removed. Since there is a film of graphite between the model and the blank, the two readily and easily fall apart. The film of graphite adhering to the formed blank is washed off. If proper skill has been used, the resultant contour of the formed blank is an exact duplicate of the model's contour. On a trimming wheel and with a coarse file the excess stock on the formed blank is removed around the edges.

The graphited model which has just been used as a die is now cleaned and whitened as much as possible with soap and whiting material in order to make it possible to shadow-test the lens for clearance over the die surface. The cornea is traced with a pencil as at K, thus indicating the limbus. The next operation is to cut and grind out the corneal portion of the contact lens so that it will clear the cornea. While the scleral band of the contact lens is required to follow the contour of the living scleral area on the eyeball, the corneal area is required to be ground into the curve of a true lens inside and to clear the cornea and limbus so that the contact lens shall at no time touch the cornea, insofar as such clearance is possible. Discomfort results if the supersensitive cornea and limbus are touched.

With a dental hand-piece and a burr or other suitable roughing tool, the inside corneal surface D of the formed blank is cut away so that it no longer rests on the cornea of the model as it did when it came out of the dies. Cutting is continued until the clearance is thought to be sufficient so that there is no chance of the lens' touching the cornea. Test of the clearance distance is obtained by finding the loss in thickness of the blank during the clearing-out operation. Ball-point micrometer calipers may be used to measure the original thickness of the blank and the thickness after the clearing-out of the corneal area has been completed. The difference in thickness indicates the amount of clearance between the cornea of the individual eye to be fitted and the inner surface of the corneal lens portion or inside corneal surface D, as shown in Fig. 3.

After this roughing-out has been done, a rough grinding operation follows with a grinding tool of crystolon abrasive mounted on an upright spindle to render the cleared-out area lenticular and even. As this grinding is being done, the pivot-point of the lens as it turns on the grinding tool is altered from one position to another in order to transfer pressure from one position to another in such a way that the cleared-out area will come into line with the cornea of the model as seen marked in pencil on the model. The grinding is continued until the cleared-out area is something larger than the area of the cornea on the model in order to prevent touching at the limbus. The cornea and limbus both are cleared in this way.

Then follows a semi-finish grind; by this time it becomes necessary to select an inside curve flat enough or sharp enough to clear the cornea at the vertex L and at the same time extend sufficiently beyond the limbus M of the cornea. For this purpose, the present inventor uses a series of grinding tools of various curvatures, from very flat to very sharp, over which a pad of cloth is placed; on this pad is used an abrasive, preferably crystolon, and from the series of curves the desired curve for the desired clearance requirements, either deep to go beyond the vertex, or flat to clear well laterally and above or below, is selected. The result of this grind is approximately the final curvature of the inside of the lens. A final polishing operation on the same tool renders the lens portion of the contact lens clear and polished on the inside.

Now, by grinding on the spindle or by means of the dental hand-piece, the sharp break O between the corneal curve and the scleral surface of the contact lens is rounded over for comfort in wearing; all that remains to be done to the inside scleral surface is to smooth up the rough surface left by the molding operation so it will be suitable for wearing on the eye. This is done with the dental hand-piece and an eraser stick with abrasive material and polish, to remove any undesirable protruding spots; while the area is smoothed and polished, the general irregularities of contour are carefully maintained because they are present in the living eye and aid in achieving good fit for the particular patient.

The contact lens is now finished as far as the inside of the lens portion is concerned, but there remains the problem of finishing the front surface to the desired corrective power.

To make the front curve of a contact lens to any required power, or to change the front curve of a contact lens from one power to another, the first consideration is the calculation of the thickness required in combination with the curve to be put onto the front of the lens. Given any back curve, constant index of refraction, and any required power; and keeping these three factors constant, the front curve of the lens and the vertex thickness at which to place this curve, are dependent upon each other. As the front curve is sharpened, the thickness must be increased; or as the front curve is sharpened, the thickness must be decreased, while the other factors remain constant. In the making of a contact lens lens portion, it is important not only to calculate the required front curve and thickness, but to design a lens which will be suitable for wear in the eye. If the lens is too thick, it will be too cumbersome and heavy for wear; if the lens is too thin, it will be too fragile, apt to become bent, dented, spoiled, torn, split, or otherwise unsatisfactory. So the calculating of a contact lens must be done accompanied by designing operations, as by cross-section sketches, to show what the final lens will look like when cut. If a lens sketch looks too heavy, its thickness must be reduced, requiring a sharper curve for the front of the lens; a new calculation must be done, selecting a new thickness and determining what curve must go with it to give the required power on the known back curve, index, and required power. When the calculations have been made, the lens-maker may begin the manufacture of the lens.

Referring to the drawings in detail, there is shown in Fig. 6 the support 10 for the motor 12 and an adjacent base 14 for a sliding tool support 16. The latter has pivotally mounted thereon a calibrated tool slide 18 upon which is slidingly mounted the radius bar 20. This bar may be advanced or retracted by the vernier screw 22, also calibrated, which is arranged to move the bar 20 and turning tool 24 one one-hundredth mm. for each index mark. This structure provides a radius cutting machine for turning the lens 26.

A set of sleeve-tools, consisting of sphere-faced tools 28 mounted on taper sleeves 30 to be attached to the taper spindle 42, has been provided. The sphere faces 28 are varied according to the several known inside curves of the corneal portions of the various lenses. The proper sphere-tool is selected for the lens to be worked, and a layer of pitch is applied thereto. Adhesive tape 34, gum face up, is applied to the pitch, and the inside corneal lens portion 36 of the lens 26 is pressed onto the gum, as shown in Fig. 9. The lens 26 is trued up to turn concentrically with the sleeve 30, and the latter is applied to the motor spindle 42, ready to be turned to the required dimensions.

On the radius-cutting machine drawing, two axes of rotation are involved, the one on which the lens turns, and the other the pivot about which as a center the turning-tool swings, so as to cut a sphere onto the front of the lens. As the lens turns, the tool in the radius-bar is swung simultaneously through an arc equal to the radius determined by how far back from the center the tool is adjusted. Thus, with the tool swinging on a radius and the lens turning at the same time, a sphere is generated onto the front face of the lens. The radius tool is adjusted or set to the radius required in the calculation plus the amount of stock to be removed to bring the lens down to the thickness of the calculation. Successive chips or cuts are taken until the excess stock has been removed and the final required radius of sphere has been achieved. The final cut is taken slowly and carefully in order to obtain as smooth a surface as possible with the least possible machine marks and the smallest possible surface irregularities; for in the polishing of the lens, the better the machined surface, the less grinding and polishing is necessary to remove these machine marks, and the more certain is it that the final lens will be a good lens. It was discovered by the inventor that due to the peculiar machining characteristics of plastics, requiring a scraping-type tool which becomes dull faster than the ordinary inclined-top tool, a flat-top tool made of tungsten-carbide or diamond, having a single round nose, is most satisfactory for this work.

When the lens has been cut down to its final curvature and thickness, the tool in the radius-bar is advanced ahead of center by a radius equal to that which has just been used to cut the convex curve of the lens. A piece of plastic material 38 suitable to machining in this manner, is held in a chuck 40 on the spindle 42, and the radius tool, now cutting a concave radius, cuts this curve into what is to become the lap for the lens.

The sleeve-mount with the lens on it is now caused to turn on a spindle 42 and the lap which has been cut in the manner just described, is caused to run on the lens surface with abrasive material applied with the brush 44 which grinds away the machining irregularities left by the radius-cutting operation and gives a relatively clear lens. Very brief hand-wiping of the lens with a cloth is sufficient to render the lens quite clear and adequate for use. After the lens has been dismounted and tested for power, quality, consistency of power, etc., it is even possible to change the power considerably by subsequent hand-polishing with a cloth. As much as two or more diopters change in the power of the lens is sometimes possible in this hand polishing before the true character of the lens is destroyed enough to require re-cutting the lens. By this cutting and grinding method, it is possible sometimes to re-cut a lens as many as seven or eight times to change its power a little each time. Of course, when the lens becomes too thin, re-cutting becomes dangerous. Also, changes in power which are radical enough to require too great a change in curvature or thickness are often difficult. The stock for the required new power must be there, or else a new lens must be made from the beginning.

The foregoing invention for the making of the front curve of a lens portion for a contact lens applies to either a plastic corneal portion made separately from the scleral portion of the contact lens, or to a portion made simultaneously within the scleral band where the whole contact lens is made starting with one piece of material. While it is possible to make such a lens portion separate of the scleral band and insert it into the scleral band at some time after the procedures are begun, this plan has not been adopted by the inventor; and it is preferred to start with one single piece of plastic as in a blank or formed blank and carry the work through without introducing any joints, laminations, insertions, or other integral or separate parts of the contact lens as a whole.

By the foregoing invention, the inventor has discovered how a contact lens corneal portion may be made using plastic only, using no glass; the inventor has discovered hereby how a corneal portion for a contact lens may be made by machining the required curve of the lens directly onto the surface of the lens and by grinding and polishing that machined surface to a lens of true vision-correcting value suitable to giving good visual acuity and clarity.

Also by this invention, the inventor has made possible, in the art of vision correction with contact lenses, the use of materials much more suited to prosthetics than glass.

The above is a description of what are all the inventor's own procedures for the fabrication of an all-plastic, non-glass contact lens from the point of his receiving a model of the front of the patient's eye up to where the contact lens has been temporarily finished on the inside. Some adjustments may subsequently have to be made to this inside result after the lens has been tried on the eye. But by means of the graphited die surface it has been found possible to make an entirely adequate formed blank which will fit as much as can be desired the living contour of the front of the eye. The graphite technique eliminates the errors in contour-copying found in additional inversions, i. e., positive to negative to positive, etc., required for metal dies; and found in using other types of separators, such as foil, which have a measurable thickness or unevenness of distribution, lumps, and other unreliable characteristics.

This application is a division of my application Serial Number 311,951, filed December 30, 1939, which issued on April 8, 1941, as Patent No. 2,237,744.

Having thus described my invention and the advantages thereof, I do not wish to be limited to the details herein disclosed, otherwise than as set forth in the claims, but what I claim is:

1. In a process of making a plastic contact lens, the steps comprising coating at least a portion of a model of the eyeball having a porous surface with a graphitic substance and molding a plastic material on the said coated surface.

2. In a process of making a plastic contact lens, the steps comprising coating at least a portion of a model of the eyeball having a porous plaster of Paris surface with a graphitic substance and molding a plastic material on the said coated surface.

3. In a process of making a plastic contact lens, the steps comprising coating at least a portion of a model of the eyeball having a porous surface of modeling stone with a graphitic substance and molding a plastic material on the said coated surface.

4. In a process of making a plastic contact lens, the steps comprising coating with a graphitic substance a positive model of the part of the individual eyeball to be fitted conforming in curvature, contour and irregularities with said part, said model being composed of a porous material having a porous surface and pressing a heated sheet of plastic material having optical properties into contact with said coated model to form a negative blank therefrom fitting said curvature, contour and irregularities of the said model.

5. In a process of making a plastic contact lens, the steps comprising coating with a graphitic substance a positive model of modeling stone of the eyeball area to be fitted and molding under heat and pressure on said coated model a sheet of plastic material having optical properties to provide a blank fitting said area.

6. In a process of making a plastic contact lens, the steps comprising coating with graphite a positive model of the part of the individual eyeball to be fitted, said model being made of porous stone and having a porous surface, and molding under heat and pressure a plastic material having optical properties between said model and a blanking die designed to press the said plastic material uniformly over the said porous stone model.

7. In a process of making a plastic scleral band of a contact lens to correspond in curvature, contour and irregularities to the corresponding area of the individual eye to be fitted, the steps comprising coating with graphite a porous stone model of the scleral area of the individual eye, pressing a heated sheet of plastic having optical properties between said model and a blanking die of a form to provide the desired front configuration of the scleral band and to press the said sheet fairly uniformly over said model and removing the said scleral band after cooling the same.

JOHN E. MULLEN.